Aug. 7, 1928. 1,680,212
G. FEATHER
ELECTRICALLY DRIVEN DRILLING MACHINE AND LIKE MACHINE TOOL
Filed Feb. 17, 1926
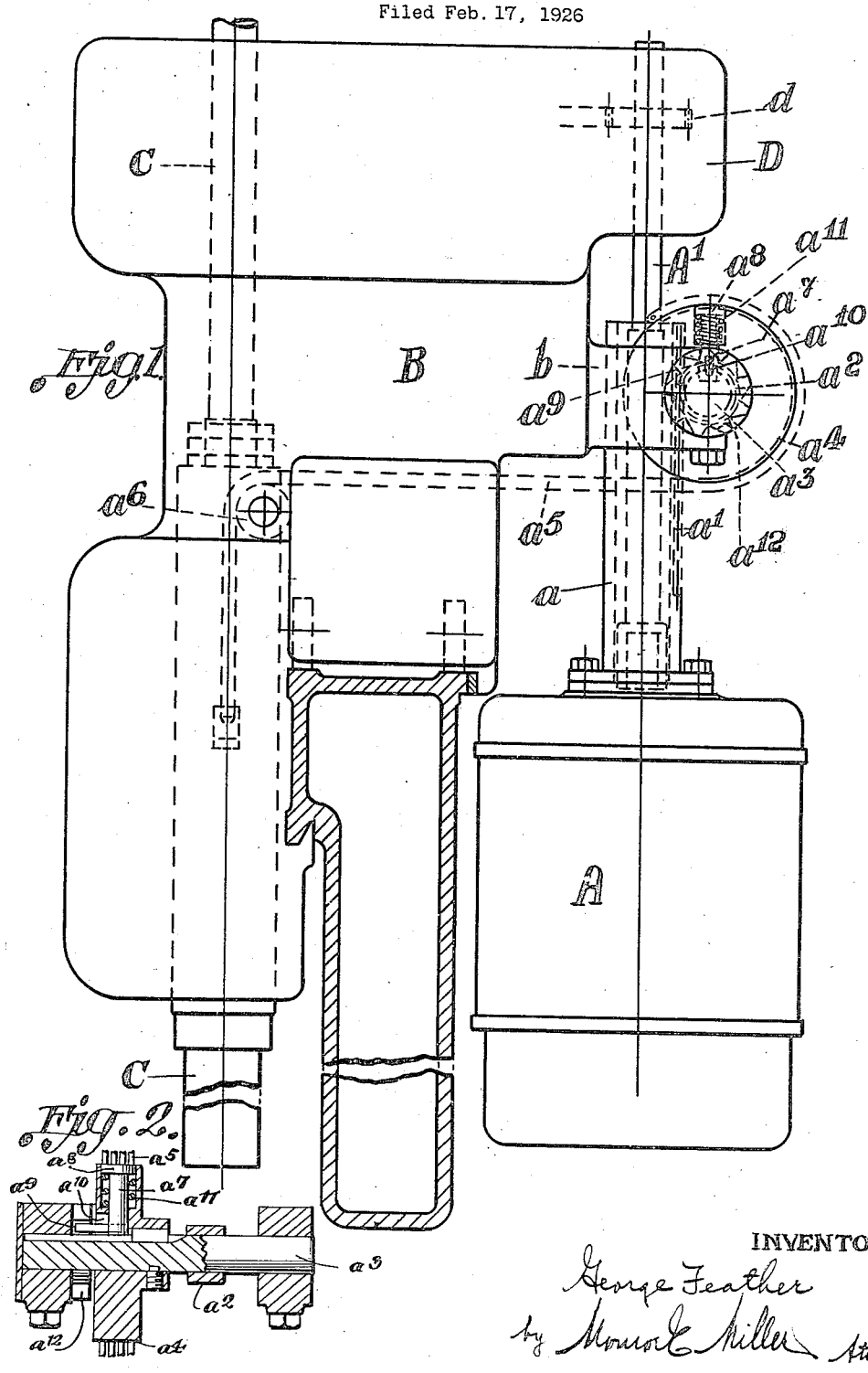
INVENTOR:
George Feather
by Monroe E. Miller, Atty.

Patented Aug. 7, 1928.

1,680,212

UNITED STATES PATENT OFFICE.

GEORGE FEATHER, OF HALIFAX, ENGLAND, ASSIGNOR TO WILLIAM ASQUITH LIMITED, OF HALIFAX, ENGLAND.

ELECTRICALLY-DRIVEN DRILLING MACHINE AND LIKE MACHINE TOOL.

Application filed February 17, 1926, Serial No. 88,876, and in Great Britain February 24, 1925.

This invention relates to electrically driven machine tools in which a counter-balanced spindle is employed and has for its chief object to introduce a more economical method of balancing the spindle than has hitherto been employed.

According to this invention the counterbalance weights as hitherto used for balancing the weight of the spindle are dispensed with and the motor which drives the spindle is connected with the latter in such manner as to wholly or mainly balance it.

In order that the said invention may be clearly understood and readily carried into effect, the same is described more fully with reference to the accompanying drawing, wherein—

Figure 1 is an elevation of a fragmentary portion of a radial drill embodying the improvements.

Fig. 2 is a vertical section on the line 2—2 of Fig. 1.

In the construction shown the motor A has attached to it a sleeve $a$ which passes through a guide block $b$ or between lugs on the carriage B and is formed with rack teeth $a^1$ for engagement with a pinion $a^2$ on a shaft $a^3$ that is fixed in the block $b$. Fixed to or forming part of the pinion $a^2$ is a wheel $a^4$ to which is attached one end of a chain $a^5$. The latter is passed round the wheel $a^4$ over a guide pulley $a^6$ and attached to the spindle C or to a part that moves therewith. Slidably mounted in a pocket in the wheel $a^4$ is a stud $a^7$ having a head $a^8$ and a pin $a^9$ which passes through a slot $a^{10}$ in one or both sides of the wheel $a^4$. Encircling the stud $a^7$ is a spring $a^{11}$ which is normally maintained in a state of compression by the chain $a^5$ bearing against the head $a^8$. If the chain breaks or comes unfastened the stud is released and the spring moves it in a direction to cause the pin to engage one or other of a number of internal toothed recesses $a^{12}$ in one or more discs which are rigidly secured to the part $b$ with the result that the motor is prevented from falling. The motor shaft $A^1$ projects through the sleeve $a$ and through a gear box D or other fitting and is splined to form a driving connection with a wheel $d$ through which motion may be imparted to the spindle C.

The details of construction can be variously modified within the scope of what is claimed presently, without departing from the spirit of the invention, in using the electric motor that drives the spindle as a counterpoise for the spindle.

What I claim as my invention and desire to secure by Letters Patent in the United States is:—

1. A machine of the character described including a rotary vertical spindle slidably axially upwardly and downwardly, an electric motor having its armature shaft parallel with the spindle, said motor being movable upwardly and downwardly axially of its shaft, an operative connection between said spindle and shaft for driving the spindle from the shaft in the different relative vertical positions of said spindle and motor, and means connecting said spindle and motor whereby the motor serves as a counterpoise for the spindle.

2. A machine of the character described including a rotary vertical spindle movable upwardly and downwardly, an electric motor having its armature shaft parallel with the spindle, the motor being movable upwardly and downwardly, a rack connected to said motor, a pinion engaging said rack to be rotated by the upward and downward movement of the motor, a flexible element operably connecting said pinion and spindle, so that the motor serves as a counterpoise for the spindle, and an operative connection between the spindle and motor for driving the spindle from the motor in the different relative vertical positions thereof.

3. A machine of the character described including a spindle and a counterpoise therefor both movable upwardly and downwardly, a connection between said spindle and counterpoise including a wheel and a flexible element on said wheel whereby the counterpoise counterbalances the spindle, and means for locking the counterpoise against downward movement including a member carried by said wheel normally held in idle position by the flexible element and arranged, when released by the breaking of said flexible element, to bring said locking means into action.

4. A machine of the character described including a spindle and a counterpoise both movable upwardly and downwardly, a wheel operably connected with the counterpoise, a flexible element connecting said wheel and spindle so that the counterpoise counterbalances the spindle, and means operable for locking said wheel, when said flexible element breaks, to prevent the downward movement of the counterpoise.

5. A machine of the character described including a spindle and a counterpoise both movable upwardly and downwardly a wheel operably connected with the counterpoise when the counterpoise moves upwardly and downwardly, a flexible element operably connecting said wheel and spindle so that the counterpoise counterbalances the spindle, a spring-pressed locking member carried by the wheel and normally held in idle position by the flexible element, and non-rotatable means for the engagement of said locking member when it is released by the breaking of said flexible element, to prevent the downward movement of the counterpoise.

In testimony whereof I affix my signature.

G. FEATHER.